(12) United States Patent
Morgan (10) Patent No.: US 8,171,655 B2
(45) Date of Patent: May 8, 2012

(54) SOLE CONSTRUCTION AND RELATED METHOD OF MANUFACTURE

(75) Inventor: Mark M. Morgan, Rockford, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 509 days.

(21) Appl. No.: 12/406,143

(22) Filed: Mar. 18, 2009

(65) Prior Publication Data
US 2010/0236098 A1    Sep. 23, 2010

(51) Int. Cl.
A43B 9/00      (2006.01)
A43B 9/04      (2006.01)
A43B 13/28     (2006.01)

(52) U.S. Cl. .............. 36/18; 36/103; 36/30 R; 36/12
(58) Field of Classification Search ........... 36/91, 92, 36/103, 12, 18, 19 R, 30 R, 17 R, 17 PW
See application file for complete search history.

(56) References Cited

U.S. PATENT DOCUMENTS

| | | | |
|---|---|---|---|
| 5,784,736 A * | 7/1998 | Issler et al. | 12/142 B |
| 6,029,301 A * | 2/2000 | Issler et al. | 12/142 B |
| 6,192,605 B1 * | 2/2001 | Challant | 36/17 R |
| 6,226,895 B1 | 5/2001 | McClelland | |
| 6,574,886 B1 | 6/2003 | Issler | |
| 6,601,319 B1 | 8/2003 | Clements | |
| 6,678,970 B2 * | 1/2004 | Liu | 36/12 |
| 7,010,867 B2 | 3/2006 | Brown | |
| 7,076,889 B2 * | 7/2006 | Palmer et al. | 36/12 |
| 7,096,602 B2 * | 8/2006 | Palmer et al. | 36/12 |
| 7,197,840 B2 * | 4/2007 | Nakano | 36/19 R |
| 7,836,609 B2 * | 11/2010 | Covatch | 36/17 R |

OTHER PUBLICATIONS

Office Action, Canadian Application No. 2,674,489, Jul. 7, 2011.

* cited by examiner

*Primary Examiner* — Jila Mohandesi
(74) *Attorney, Agent, or Firm* — Werner Norcross & Judd LLP (57) ABSTRACT

A footwear construction including an upper, a midsole including a midsole flange, and an outsole shell including an outsole flange. The flanges can project outwardly, away from the upper in the forefoot portion. The flanges can be joined with a direct attach bond and a lock stitch. The flanges can each terminate short of the heel portion. The lock stitch can terminate short of the heel portion, and can be visible above and below the joined flanges. The midsole can include a fully exposed and viewable portion in the heel portion of the footwear. The midsole can include a heel cup integrally formed with the midsole flange. A method for constructing the footwear includes direct attaching a midsole to an upper and an outsole including an outsole flange. The midsole can form with a midsole flange, and the midsole flange and outsole flange can be stitched together with a lock stitch.

14 Claims, 5 Drawing Sheets

SOLE CONSTRUCTION AND RELATED METHOD OF MANUFACTURE

BACKGROUND OF THE INVENTION

The present invention relates to footwear and, more particularly, to a footwear sole construction and method for making the same.

There is an ongoing effort in the footwear industry to produce footwear that provides durability and flexibility. Many conventional footwear constructions, however, provide either comfort or flexibility—but usually not both—because the features providing these characteristics typically negate one another.

For example, one construction that is known for its flexibility is a direct attach construction, which includes an upper direct attached to an upper with a midsole. A typical direct attach construction includes a flat wearing outsole direct attached to a flexible polyurethane midsole, which in turn, is direct attached to an upper. The wearing outsole typically includes a flat upper surface to which the polyurethane midsole is secured by molding the polyurethane over the surface during manufacture of the shoe.

Although this direct attach construction is flexible and resilient, it is not sufficiently durable because the wearing outsole is prone to detach from the midsole, particularly in the toe region if a wearer scuffs their forefoot along the ground as they walk. In some cases, the outsole can detach completely from the midsole, which can cause injury to the wearer, especially if they are engaged in strenuous activity.

One solution to the detachment of the outsole from the midsole utilizes an outsole shell that encapsulates a lower part of the midsole. Such a construction is disclosed in U.S. Patent Application 2004/0143995 to McClelland, which is hereby incorporated by reference. In McClelland, the outsole shell includes wall that extends around the entire upper, from heel to toe. This wall includes inwardly extending scallops to which the midsole material direct attaches to form a mechanical interlock, which secures the outsole to the midsole. A potential issue with this durable construction, however, is that the midsole shell, and particularly the interlock, can sometimes compromise the flexibility and comfort of the sole, particularly in the heel.

Although different constructions exist that provide either durability or flexibility and comfort, there are few footwear that provide both.

SUMMARY OF THE INVENTION

The present invention provides a durable and comfortable footwear construction. The present construction can include an upper, a midsole including a midsole flange, and an outsole including an outsole flange. The flanges can project outwardly, away from the upper in the forefoot portion, and can be joined with a direct attach bond as well as an optional lock stitch to prevent detachment of the outsole from the midsole.

In another embodiment, the midsole flange and/or the outsole flange can terminate short of the heel portion, optionally terminating in the forefoot portion and/or arch portion of the footwear. Further optionally, the lock stitch can terminate short of the heel portion, and can be visible above and below the joined flanges.

In yet another embodiment, the outsole can be an outsole shell construction. The outsole shell can include an upwardly standing wall topped with an outsole flange. The outsole flange can project outwardly, away from the upper in the forefoot portion. Optionally, the upwardly standing wall can terminate short of the heel portion, and can conceal at least a portion of the midsole in the forefoot portion, while leaving another portion of the midsole visible in the arch and/or heel portion.

In still another embodiment, the footwear can include a flexible sole board lasted to the upper. The sole board can include a first side that faces the upper and a second side opposite the first side. The midsole can be joined with the second side of the flexible sole board by a direct attach bond.

In a further embodiment, the midsole can include a heel cup in the heel portion. The heel cup can include an exterior surface that is visible to a viewer in the heel portion. Optionally, the midsole can be of a unitary single-piece construction, with the heel cup integrally formed with the midsole flange and the other components of the midsole.

In yet a further embodiment, the lock stitch can extending around the forefoot portion, extending through the midsole stitch flange and the outsole flange to physically join the midsole stitch flange and the outsole flange. Optionally, the lock stitch can be visible to a viewer both above the midsole stitch flange and below the outsole flange.

In another further embodiment, a method for making the footwear construction is provided. The method can include: optionally lasting a sole board to an upper; providing an outsole shell including an upwardly standing wall having an outsole flange that projects outwardly, away from the upper in the forefoot portion; placing the upper and the outsole shell adjacent one another so that a midsole cavity is formed therebetween; introducing a material into the midsole cavity so that the material direct attaches to at least one of the upper and the sole board, and so that the material direct attaches to the outsole shell, the material forming a midsole including a midsole stitch flange that projects outwardly, away from the upper in the forefoot portion, the midsole stitch flange direct attaching to the outsole flange; and stitching the midsole stitch flange to the outsole flange with a lock stitch, the lock stitch terminating short of the heel portion.

The present footwear construction provides remarkable and unexpected flexibility and durability. The joined midsole flange and outsole flange render the forefoot portion of the footwear durable, well-supported and flexible. Where the lock stitch is included, the midsole and outsole shell are resistant to detachment in the forefoot region. Where included in the heel region of the footwear, the heel cup provides a cushion and returns energy. Where the midsole remains visible to a viewer in the heel and/or arch portion, the construction provides added aesthetic appeal.

These and other objects, advantages and features of the invention will be more readily understood and appreciated by reference to the detailed description of the current embodiment and the drawings.

DETAILED DESCRIPTION OF THE CURRENT EMBODIMENT

I. Construction

A shoe incorporating the integrated construction of the current embodiment is shown in FIGS. 1-5 and generally designated 10. For purposes of the disclosure, the embodiment is described in connection with a ¾ height boot, however, the sole construction is well suited for use with other types of soled footwear. In general, the shoe 10 includes an upper 20 secured to an outsole shell 40 with a midsole 30 positioned at least partially therebetween. The midsole 30 includes midsole stitch flange 32, also referred to as a midsole flange, that projects outwardly, away from the upper 20 in the forefoot portion 42 of the footwear. The outsole shell 40 can be joined with the midsole 30, and can include an upwardly standing wall 41 having an outsole flange 45 that projects outwardly, away from the upper in the forefoot portion as well. The outsole flange 45 can be joined with the midsole flange 32 by both a direct attach bond and a lock stitch 50 extending through the midsole flange 32 and the outsole flange 45. The midsole 30 can include an integral heel cup 34 disposed in the heel portion 44.

As used herein, the term "arch region" (or arch portion) refers generally to the portion of the shoe corresponding to the arch of the wearer's foot; the term "forefoot region" refers generally to the portion of the shoe forward of the arch region corresponding to the forefoot (e.g., the ball and the toes) of a wearer's foot; and the term "heel region" refers generally to that portion of the shoe rearward of the arch region corresponding to the heel of the wearer's foot. The forefoot region 42, arch region 43 and heel region 44 are generally identified in FIG. 1, however, it is to be understood that delineation of these regions may vary depending upon the configuration of the footwear.

The upper 20 is generally conventional and will not be described in detail. Suffice it to say that the upper 20 includes vamp 22, quarters 24 and backstay 26. With reference to FIGS. 2-5, the upper 20 includes a lower portion that transitions to an allowance 23, also referred to as a peripheral allowance, which is folded inward toward the center of the footwear. The upper 20 may be manufactured from leather, canvas, nylon, or other suitable materials and may include a liner (not shown) or other conventional accessories. A removable footbed or insole (not shown) can be positioned within the upper as desired.

Part or all of the peripheral allowance 23, and in some cases, the lower portion of the upper 20, can be direct attached to the midsole 30, as described in detail below. The peripheral allowance 23 itself can be lasted to a sole board 28, or optionally Strobel stitched to an insole and/or fabric sock liner (not shown). Where the upper 20 is lasted to the sole board 28, the board can be generally flexible, and can be cemented, stitched, stapled or otherwise fastened to the upper, and in particular, the peripheral allowance. The sole board can be constructed from a variety of conventional materials.

Figure 4:
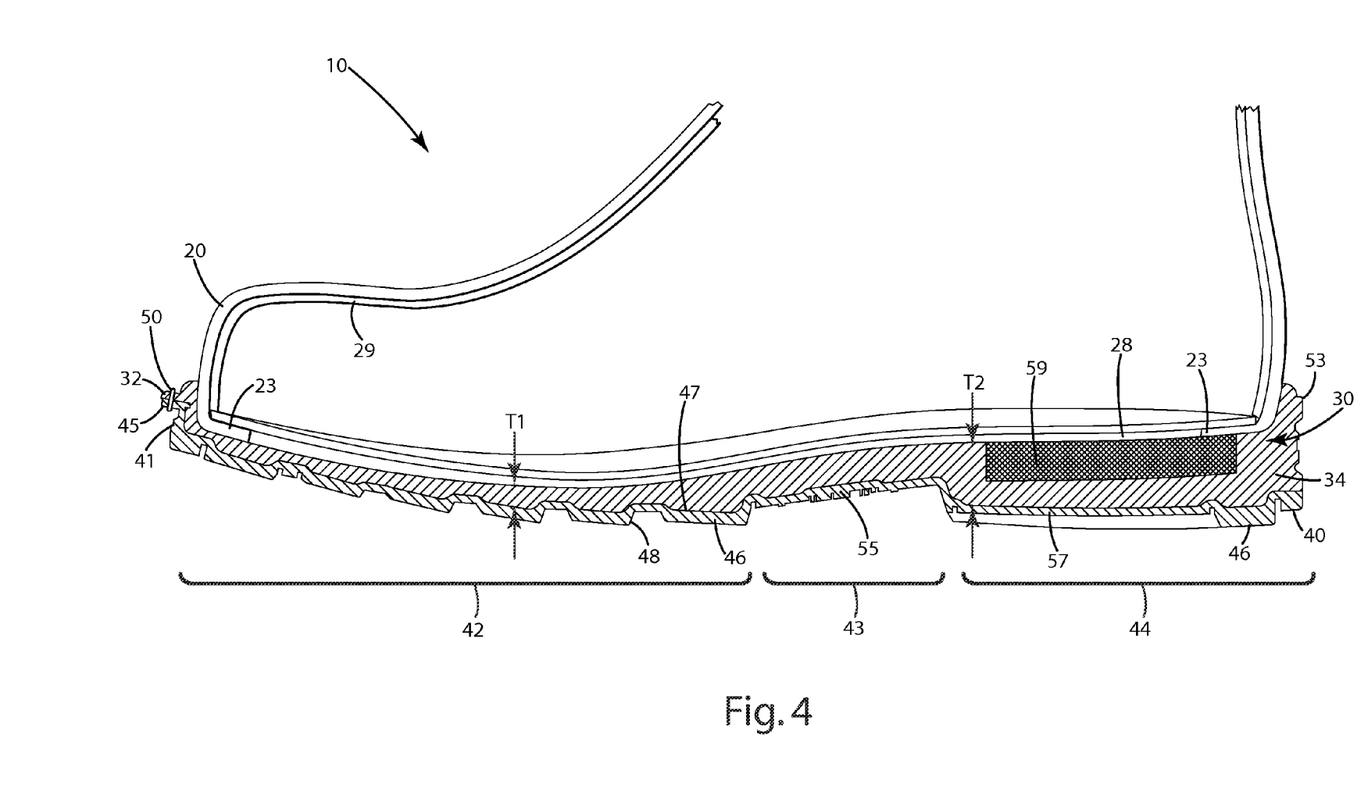
FIG. 4 is a section view of the footwear taken along lines 4-4 of FIG. 1.

A liner 29 can be secured to an interior of the upper 20. This liner, as shown in FIG. 4, extends downward, toward the inwardly folded peripheral allowance 23. In one embodiment, the liner terminates a pre-selected distance above the fold of the upper that forms the peripheral allowance 23. In another embodiment, the liner extends upwardly to the uppermost portion of the shoe 10. The liner may be constructed of any material, but preferably is constructed from a water impermeable fabric or material. Suitable materials include the material sold under the trademark GORE-TEX, which is commercially available from W.L. Gore & Associates, Inc. of Newark, Del., and the material sold under the trademark SYMPATEX, which is commercially available from Sympa-Tex Technologies GmbH, Wuppertal, Germany. The liner may additionally or alternatively be constructed from a continuous layer of waterproof thermoplastic or adhesive, which coats the interior of the upper.

The outsole shell 40 can be manufactured from a relatively hard rubber or other sufficiently durable and wear-resistant material. The bottom 46 can include an outer surface 48 that forms the wearing surface of the outsole shell 40 and can be contoured to the desired heel and tread pattern. The outer surface 48 can be textured to improve the traction and aesthetic appeal of the shoe. Optionally, the upper surface 47 of the outsole can be textured as well.

Figure 5:
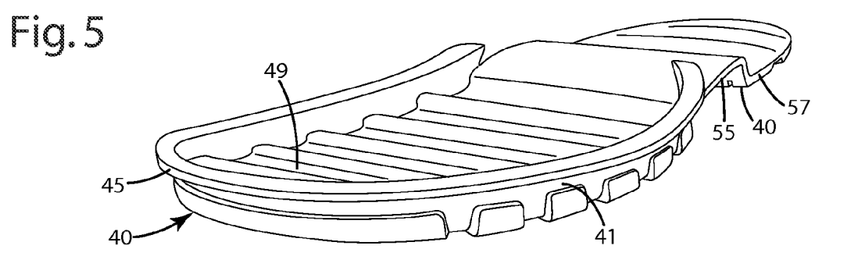
FIG. 5 is an exploded perspective view of the footwear.

As shown in FIG. 5, the outsole shell 40 can include an upwardly standing wall 41 in the forefoot region 42. This upwardly standing wall can generally extend vertically from the upper surface 47, and can generally be continuous around a periphery of the forefoot region 42. However, as desired, the wall 41 can be interrupted in one or more locations to provide a desired visual effect. The wall 41 can also cooperate with the upper surface 47 to form an outsole shell recess or cavity 49 in the forefoot region 42. Optionally, the wall 41 can extend somewhat into the arch region 43 so that the recess 49 is at least partially formed there as well. The recess 49, and wall 41 however, can terminate short of the heel portion 44 as desired.

The outsole shell 40 can transition from the outsole upstanding wall 41 to a plate-like structure. For example, the outsole shell 40 can include an arch plate portion 55 in the arch portion 43 of the footwear. In general, this arch plate portion can be void of any upstanding walls on the lateral and medial sides of the footwear. Where the walls are not included, the midsole 30, located above the outsole shell plate portion, can be exposed to view. The arch plate portion 55 also can include a shank (not shown) adjacent it, and can be generally planar as desired. The shank can be constructed of steel, plastic or other material, and can overlap with the other regions, for example, the forefoot region 42 and heel region 44 as desired. Optionally, in some applications, the outer surface 48 of the outsole shell in this portion can include a tread, lugs, or other desired surface features.

The arch plate portion 55 of the outsole shell 40 can transition to a heel plate portion 57 in the heel portion 44 of the footwear. This heel plate portion can also be void of any upstanding walls so that the midsole forms an exterior surface 35 is generally exposed to view. As illustrated, the heel plate portion 57 can include a tread pattern or lugs 46 on the outer surface 48 of the outsole shell to provide the desired amount of traction. If desired, the tread pattern or lugs 46 of the heel plate portion 57 can be reflected thought the heel plate. For example, while referred to as a plate, the portion 57 can define recesses therein that form the lugs in the heel portion 44 of the footwear. These recesses can be filled with the material that forms the midsole to provide a desired cushioning effect.

Figure 1:
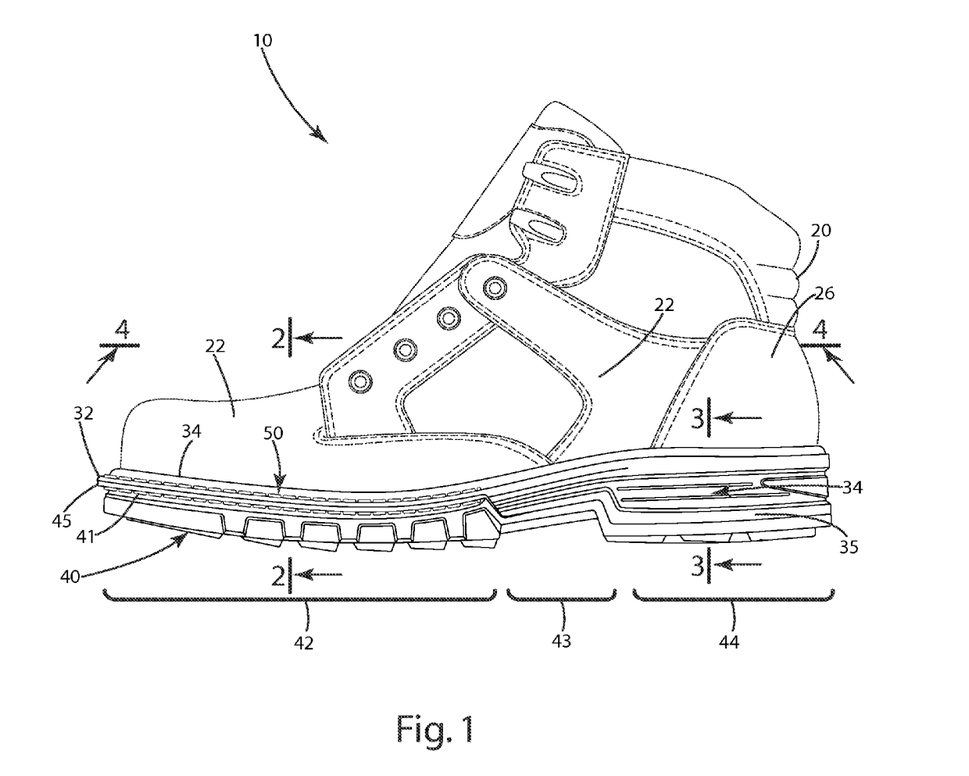
FIG. 1 is side view of an article of footwear incorporating the sole construction of a current embodiment.
Figure 2:
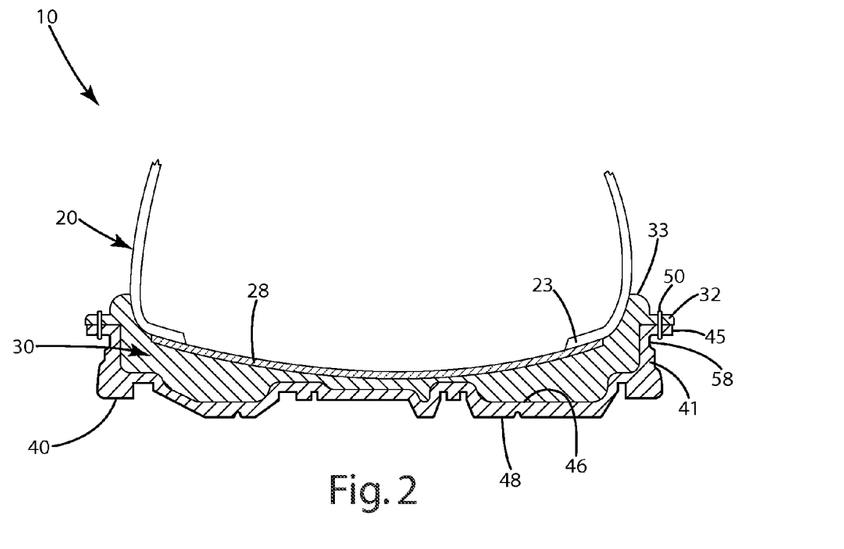
FIG. 2 is a section view of the footwear taken along line 2-2 of FIG. 1.

Returning to the outsole shell 40 in the forefoot portion 42, the recess 49 can be filled partially or entirely by the material that forms the midsole 30, with the midsole within the recess generally taking the same shape as that of the wall 41 and/or upper surface 47 of the outsole shell. Where the wall 41 and recess 49 terminate, the midsole 30 can be fully exposed, unconcealed by those components of the outsole shell 40. For example, as shown in FIGS. 1 and 2, the midsole 30 includes exposed region 35, which generally extends from the arch portion 43 into the heel portion 44, generally positioned adjacent and above the arch plate portion 55 and the heel plate portion 57 of the outsole shell 40. There, the exposed region 35 extends upward from the arch plate portion and the heel plate portion to the upper 20. Of course, if another structure is interposed between the upper and these components, the size and shape of the exposed region can vary.

As shown in FIGS. 2-5, the midsole 30 can extend from the heel portion 44 to the forefoot portion 42, formed as a single-piece, unitary and integral structure. While the midsole 30 is shown in the current embodiment as being direct attached to the upper 20, sole board 28 and/or outsole shell 40, it can alternatively be attached to these components with cement or adhesives. Returning to the direct attach midsole construction, the material from which the midsole is constructed, for example polyurethane or ethylvinyl acetate, bonds directly to the peripheral allowance 23 and the sole board 28 to join the midsole 30 with the upper 20. Immediately adjacent the upper, the midsole can form a bead or a shoulder 33, which is generally rounded, and circumferentiates the entire upper. As desired, this shoulder can be interrupted to provide a desired appearance in certain regions of the footwear.

The midsole 30 also includes a midsole flange 32 that extends or projects generally outwardly, away from the upper 20 and the remainder of the midsole 30 in the forefoot portion. This midsole flange 32 can extend outward from the shoulder 33 a distance of 1, 5, 10, 20, 30 or 40 millimeters, or other distances as desired. The midsole flange itself can define a groove (not shown) within which the lock stitch 50 is recessed to prevent excessive abrasion to the stitching.

As shown in FIGS. 1 and 5, the midsole stitch flange 32 terminates short of the heel portion 44, but can transition gently to a small aesthetic protrusion 53 that extends around the heel portion as desired. This protrusion 53 can be of insufficient width to accommodate a stitch through it.

The midsole 30 can also include an integral heel cup 34 in the heel portion, the heel cup being part of the exterior surface of the exposed region 35 that is visible to a viewer in the heel portion 44, and optionally the arch portion 43. In general, in making the transition from the forefoot portion to the heel portion, the thickness of the midsole can vary as shown in FIG. 4. There, the thickness T1 of the midsole in the forefoot portion 42 is less than the thickness T2 of the midsole in the heel portion 44. This thickness T2 can be, for example 1 to 3 to 5 times or more, thicker than the thickness T1 as desired. If desired, these thicknesses, however, can be equal, or reversed, that is, T1 can be greater than T2, depending on the desired cushioning characteristics of the shoe.

Optionally, the midsole 30 and waterproof liner 29, which is secured within or to the upper 20, may cooperate to render the interior of the upper substantially waterproof.

Figure 3:
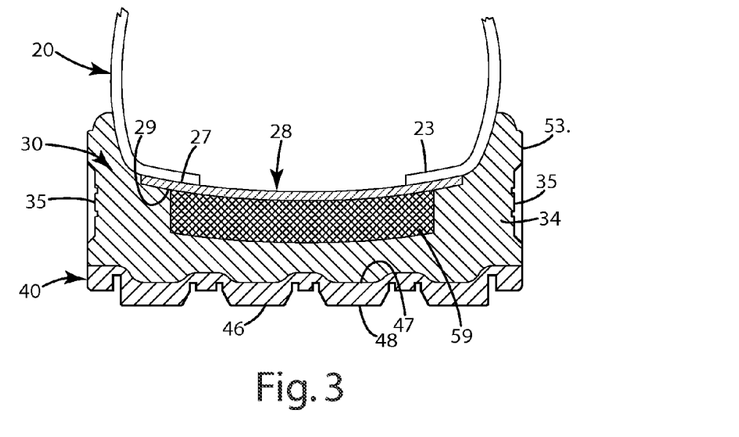
FIG. 3 is a section view of the footwear taken along lines 3-3 of FIG. 1.

The heel cup 34 can snugly fit in or adjacent the outsole 40 as shown in FIG. 3. The heel cup 34 can be cup-shaped to cushion the heel of the wearer and extend upwardly around at least a portion of the wearer's heel. As shown, the heel cup 34 is positioned substantially in the heel region 44, but extends somewhat into the arch region 43. As desired, the heel cup can terminate short of the arch region or can extend beyond the arch region into the forefoot region 42. Optionally, the midsole can include a heel cushion 59 joined with and/or positioned in or over the heel cup 34 to provide added heel cushion, and to help center the wearer's heel.

In the fully assembled footwear shown in FIGS. 1-5, the outsole shell 40 can be secured in the forefoot region 42 to the midsole flange 32 and to at least the heel cup 34 in the heel region 44. More specifically, the outwardly extending flange 42 of the outsole shell can be bonded with a direct attach chemical bond directly to the midsole flange 32 in the forefoot portion 41. In the arch portion and heel portion the arch plate 55 and the heel plate 57 can likewise be bonded with a direct attach bond to the midsole 30. If a direct attach construction is unsuitable, the bond between the midsole and outsole shell can alternatively be achieved with cement, adhesives or other suitable fasteners.

In addition to the direct attach chemical bond between the midsole flange 32 and the outsole flange 42, these components optionally can be physically joined with a lock stitch 50. The lock stitch can be a continuous stitching element, such as a thread, extending around at least a portion of the forefoot portion 41. The lock stitch 50 can terminate short of the heel portion 44 of the footwear as desired, or wherever the midsole flange and outsole flange no longer overlap sufficiently to accommodate a lock stitch therethrough. The lock stitch 50 can extend entirely through both the midsole stitch flange 32 and the outsole flange 45 to physically join these elements— in addition to the direct attach bond already between these elements. The lock stitch 50 can also be stitched in such a manner so that the lock stitch is visible to a viewer both above the midsole stitch flange 32 and below the outsole flange 45. Optionally, where the outsole shell 40 includes a stitch groove 58 (FIG. 2), the lock stitch 50 can be at least partially disposed within that groove.

II. Manufacture and Assembly

Manufacture of the shoe 10 will now be described with reference to FIGS. 2-6. The upper 20 can be manufactured using generally conventional techniques and apparatus. For example, the desired upper material (not shown) can be cut to form the upper. Although not shown, the upper may include multiple elements, such as a vamp, quarters and a back stay. If included, these pieces of the upper are fitted and sewn together. The optional water impermeable liner can be secured within the upper via adhesives or stitching that does not deteriorate the water impermeability of the liner in the desired areas. This liner can be fitted to the upper so that in the finished footwear, it extends downward a sufficient distance so that the later-added midsole terminates above the lowermost portion of the liner.

Figure 6:
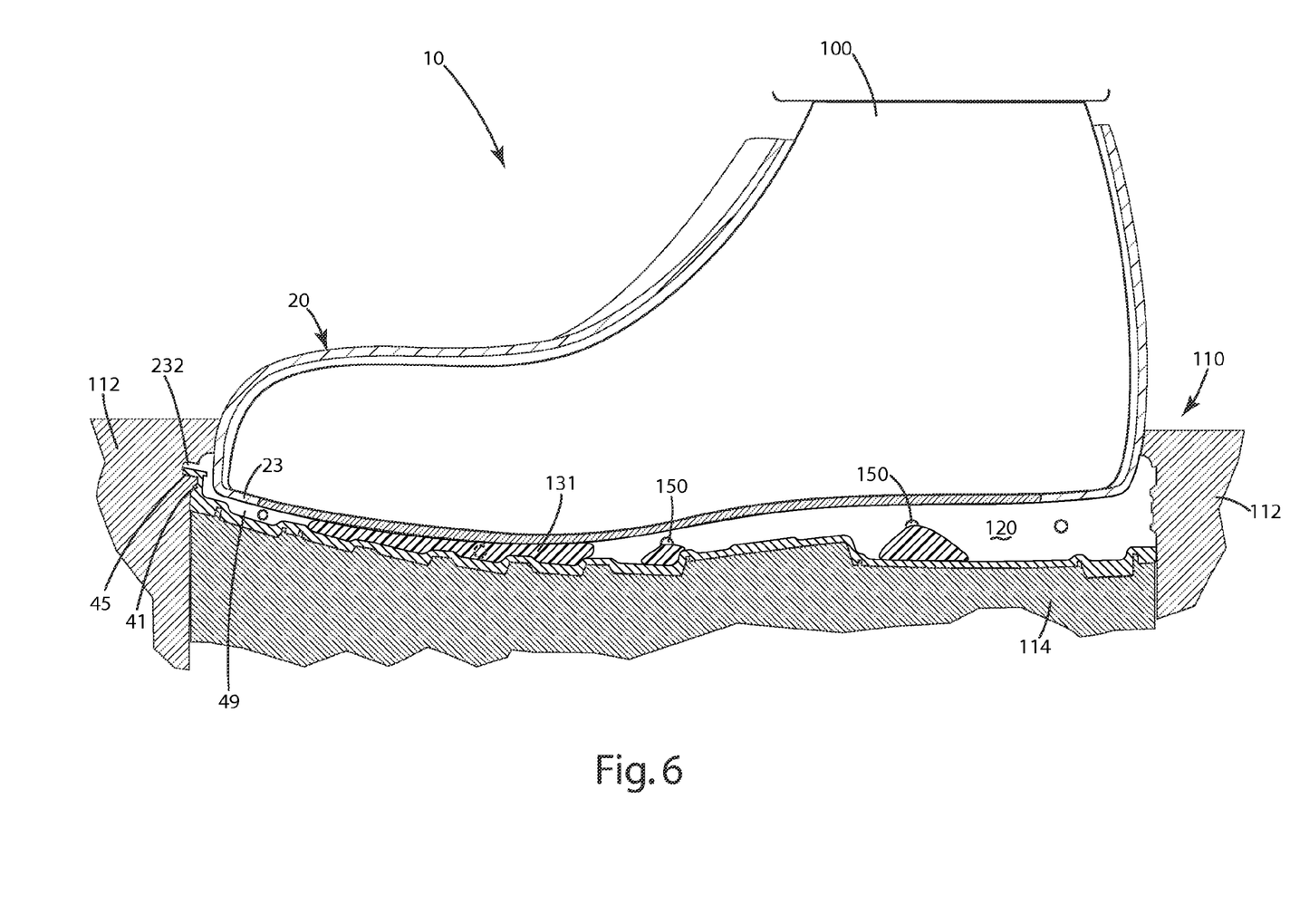
FIG. 6 is a section view of a midsole being joined with the upper and outsole of the footwear.

The upper 20 can be fitted on a last 100 as shown in FIG. 6. The peripheral allowance 23 can be temporarily tacked or stapled to the last 100 to hold the allowance in place. The peripheral allowance 23 then can be board lasted with cement, adhesive or other attachment means to the first side 27 of the sole board 28, with the opposite side 29 of the board 28 remaining exposed. With the upper 20 lasted to the sole board 28, these components are ready for a direct attach molding operation as illustrated in FIG. 6.

Before the direct attach molding operation, however, the outsole shell 40, with the features described above, can be manufactured. That outsole shell 40 can be injection molded or pour molded from a hard, durable rubber or other materials as desired. The tread pattern 48 on the lower surface 46, the upwardly extending wall 41, the recess 49 and the arch and heel portion plates of the outsole shell 40 can be formed during the molding operation as integral parts of the outsole shell.

With the outsole manufactured, it is placed in the bottom of the mold 110 as shown in FIG. 6. The board lasted upper 20, with the sole board 28 attached is lowered against the mold 110, which includes side molds 112 and bottom 114 upon which the outsole shell 40 is supported. Only one side mold 112 is shown in FIG. 6, however, it is noted that a corresponding side mold opposing the depicted side mold is included. Each side mold 112 wraps around the sides of the lasted upper 20, and mate with one another at the front and rear of the shoe.

In general, the upper 20 and sole board 28, and the outsole shell 40 are placed adjacent one another so that a midsole cavity 120 is formed therebetween. The side molds 112 also cooperate to define part of the cavity 120 as well. The midsole cavity 120 in the forefoot portion 42 further defines corresponding midsole flange voids 232 which, when filled with material, form the midsole flange 32 of the completed midsole 30.

With the midsole cavity 120 properly formed by the components, the appropriate volume of material to form the midsole 30 is injected or poured through ports 150 into the cavity 120. The mold 110 holds the upper 20 firmly enough to prevent material from exiting the mold 110 from the top of the cavity 120. As the material 131 is introduced into the cavity, it substantially fills the cavity 120, so that the material 131 direct attaches to the upper and the sole board, and so that the material direct attaches to the outsole shell. As it fills the midsole cavity, the material forms the midsole 30 including the midsole stitch flange 32 that projects outwardly, away from the upper 20 in the forefoot portion. The midsole stitch flange 32 also direct attaches to the outsole flange 45. As this occurs, the heel cup 34 is also formed as described above.

The midsole material 131 is allowed to sufficiently cure and direct attach the midsole components to the outsole components, the sole board and the upper. The side molds 112 are moved away from the footwear and the last 100 is moved upward in the direction indicated with the vertical arrow 101. Any excess flashing resulting from the direct attach process may be trimmed from the midsole 30.

With the outsole shell 40 joined with the midsole 30 and thus the upper 20, the finished shoe 10 can be removed from the last 100. To further physically join the midsole 30 and the outsole shell in at least the forefoot portion 42, the midsole stitch flange 32 is lock stitched with stitching to the outsole flange 45. The location of the lock stitch can correspond to the flanges as desired, and optionally can terminate short of the heel portion.

A number of conventional finishing operations can then be performed on the shoe 10. For example, the edges of the midsole flange and outsole flange, and other parts of the midsole can be trimmed and shaped. The upper 20 can also be cleaned, polished and treated as desired.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "the," is not to be construed as limiting the element to the singular.

The embodiments of the invention in which an exclusive property or privilege is claimed are defined as follows:

1. A footwear construction including a forefoot portion, an arch portion and a heel portion, the footwear construction comprising:
    an upper;
    a midsole joined with the upper, the midsole including a midsole flange integrally formed with the midsole that projects outwardly, away from the upper in the forefoot portion, the midsole including an exterior surface that is visible to a viewer in the heel portion of the completed footwear construction, the midsole being a unitary, single piece construction that extends into the forefoot portion and the heel portion; and
    an outsole shell joined with the midsole, the outsole shell including an upwardly standing wall having an outsole flange that projects outwardly, away from the upper in the forefoot portion, the outsole flange being joined with the midsole flange by both a direct attach bond and a lock stitch extending through the midsole flange and the outsole flange,
    wherein the outsole flange terminates short of the heel portion,
    wherein the lock stitch terminates short of the heel portion.

2. The footwear construction of claim 1 wherein the lock stitch extends around at least a portion of the forefoot portion.

3. The footwear construction of claim 2 wherein the lock stitch is visible to a viewer both above the midsole flange and below the outsole flange.

4. The footwear construction of claim 3 comprising a sole board including a first side that faces the upper and a second side opposite the first side, wherein the second side is joined with the midsole by a direct attach bond.

5. The footwear construction of claim 1 wherein the upwardly standing wall of the outsole shell transitions to an arch plate portion in the arch portion of the footwear, wherein the arch plate portion transitions to a heel plate portion in the heel portion.

6. The footwear construction of claim 5 wherein midsole includes an integral heel cup in the heel portion, the heel cup including the exterior surface that is visible to a viewer.

7. The footwear construction of claim 1 wherein the midsole includes a heel cup that is integral with the midsole flange, wherein the midsole is visible to a viewer in the forefoot portion in the form of the midsole flange, and visible in the heel portion in the form of the heel cup.

8. A footwear construction including a forefoot portion, an arch portion and a heel portion, the footwear construction comprising:
    an upper including a peripheral allowance joined with a flexible sole board having a first side that faces the upper and a second side opposite the first side;
    a midsole joined with at least one of the upper and the second side of the flexible sole board by a direct attach bond, the midsole including a midsole stitch flange integrally formed with the midsole that projects outwardly, away from the upper in the forefoot portion, the midsole stitch flange terminating short of the heel portion, the midsole being a unitary, single piece including an integral heel cup in the heel portion, the integral heel cup including an exterior surface that is visible to a viewer in the heel portion of the completed footwear construction;
    an outsole shell joined with the midsole by a direct attach bond, the outsole shell including an upwardly standing wall topped with an outsole flange that projects outwardly, away from the upper in the forefoot portion, the outsole flange joined with the midsole flange by at least a direct attach bond, the outsole flange terminating short of the heel portion, the outsole upwardly standing wall concealing at least a portion of the midsole in the forefoot portion, the upwardly standing wall terminating short of the heel portion to expose the heel cup of the midsole in the heel portion; and
    a lock stitch extending around at least a portion of the forefoot portion, the lock stitch extending through the midsole stitch flange and the outsole flange to further join the midsole stitch flange and the outsole flange, the lock stitch being visible to a viewer both above the midsole stitch flange and below the outsole flange, the lock stitching terminating short of the heel portion.

9. The footwear construction of claim 8 wherein the outsole shell includes a ground contacting portion joined with the outsole upstanding wall to form an outsole recess in the forefoot portion, wherein the midsole extends downwardly into the outsole recess.

10. The footwear construction of claim 8 wherein the outsole upwardly standing wall defines a stitching groove adjacent the outsole flange, wherein the lock stitch is at least partially disposed in the stitching groove.

11. The footwear construction of claim 8 wherein the outsole upstanding wall transitions to an arch plate portion that is located in the arch portion of the footwear, wherein the arch plate portion transitions to a heel plate portion that is located in the heel portion.

12. The footwear construction of claim 11 wherein the heel plate portion includes a first side facing the midsole, and a second side opposite the first side, the second side of the heel plate portion including a tread pattern.

13. The footwear construction of claim 8 wherein the midsole includes a first thickness in the forefoot portion, and a second thickness in the heel portion, the second thickness being greater than the first thickness, wherein the portion of the midsole including the second thickness forms the heel cup.

14. The footwear construction of claim 8 wherein the midsole extends from the heel portion to the forefoot portion, and the midsole is visible in the heel portion in the form of a heel cup, and the midsole is also visible in the forefoot portion in the form of the midsole stitch flange.

* * * * *